UNITED STATES PATENT OFFICE.

THOMAS A. EDISON, OF LLEWELLYN PARK, NEW JERSEY.

PROCESS OF MAKING COMPOSITE METALS.

No. 827,717.   Specification of Letters Patent.   Patented Aug. 7, 1906.

Application filed March 30, 1905. Serial No. 252,933.

*To all whom it may concern:*

Be it known that I, THOMAS ALVA EDISON, a citizen of the United States, residing at Llewellyn Park, Orange, in the county of Essex and State of New Jersey, have invented a certain Process of Making Composite Metals, of which the following is a description.

My invention relates to the formation of a new product—namely, a composite metal in which two or more metals are physically admixed in such a way that each metal exists as a practically integral sponge-like structure, the cells or pores of either metal being completely filled by the body presented by the other metal, whereby the entire bulk of the composite structure as a whole will be continuously solid throughout. Such a composite metal is characteristically distinguished from any so-called "alloy" heretofore made, so far as I know, in the respect that it consists of sponge-like interlocking masses, so that it becomes possible by dissolving or otherwise removing one of the metals to obtain a sponge-like integral mass of the other metal, whereas with ordinary alloys, owing to their intimate molecular admixture, the attempt to dissolve any one of the constituents of the alloy results in the disintegration of the mass. This characteristic peculiarity of my improved composite metal makes it possible to secure very beautiful sponge-like effects in various metals by first forming the composite metal and then removing one of the metals, and it also becomes possible to secure attractive effects in many arts where it is desirable that two or more metals should be mechanically associated together. The primary purpose for which I have used the composite metal referred to is for the production of scales, flakes, or foils of nickel and cobalt for admixture with the active material in the negative electrode of my improved storage battery. As I have pointed out in application for Letters Patent filed concurrently herewith, Serial No. 252,935, good contact with such active material and between the flakes or foils themselves is secured when metallic cobalt is used; but as I have explained it is undesirable to use metallic cobalt alone, owing to the fact that its surface becomes oxidized by electrolysis and might in time penetrate the whole mass, and hence it might be advisable to make use of a composite metal of cobalt and nickel. Such a composite metal serves to give excellent contact, and the presence of the nickel therein prevents penetration of oxid within the nickel-cobalt to a harmful extent, since the metallic nickel forms a continuous integral connecting-sponge, and therefore protects the cobalt from the possibility of inward oxidation to any harmful extent.

Assuming a composite metal of nickel and cobalt to be manufactured for the purpose of forming scales, films, or foils for use in the make-up of my improved battery, I proceed substantially as follows: A solution of sulfate of nickel and sulfate of cobalt is first obtained in the proper relative quantity to give to the resulting product the desired proportions of the two metals. Excellent results have been secured with a composite metal containing sixty per cent. of cobalt and forty per cent. of nickel; but these proportions may be varied within quite wide limits. The solution of cobalt and nickel sulfates is now added to a potash solution in excess of that necessary to precipitate the two salts, and the two solutions thus added are boiled, resulting in the precipitation of hydroxids of nickel and cobalt, which are allowed to settle. The solution is now drawn off and the precipitated mixed hydroxids are washed successively until the mass is free of potash and sulfates. In this way I obtain a physically and intimately mixed mass of hydroxids of the two metals in the desired proportion. The mixed hydroxids are now dried and screened into granules of substantially uniform size—for instance, those passing a thirty-mesh screen and arrested by a sixty-mesh screen—after which the granules are subjected to the reducing action by hydrogen-gas in a heated retort to reduce the hydroxids to the respective metals and also to weld together the metallic particles constituting each of the granules, so that each granule will be composed of a combination of the two metals having the characteristics before pointed out. The reduced metallic granules are now subjected to successive rolling operations with oil to convert the composite metal into fine scales or flakes, as is common in the art, for example, of making bronze-powder. Preferably the flakes are annealed two or more times between the passes of the rolling operation in an inert gas, such as hydrogen, at a red heat. After the flakes or foils are formed it is desirable in order to increase their bulk to pass them between very fine crimping-rolls, by which they will be crimped, corrugated, or otherwise distorted, or between rolls of very small diameter, by which they will be curled or formed into minute spirals. These flakes or foils are added to the active material of the battery in any suitable way—for example, as I have described in my concurrent applications, Serial Nos. 252,929 and 252,930, wherein the conducting-flakes are first assembled and then welded to constitute a sponge-like or honeycomb structure, in which the active material is introduced by successively dipping the same into a saturated solution of the active salt and alternate evaporation of the solvent; or instead the active particles may be coated with a sticky material, such as molasses, and then admixed with the metallic flakes or scales, being then assembled in the pockets, a moderate pressure applied, the molasses being then dissolved out and the final pressure applied, as I describe in my concurrent application, Serial No. 252,931.

Having now described my invention, what I claim as new therein, and desire to secure by Letters Patent, is as follows:

1. The process of manufacturing composite metals which consists in first forming an intimate admixture of reducible salts of two or more metals and finally in subjecting the mixture to the effect of heat in a reducing atmosphere to reduce the same to the metallic state and weld the particles together, substantially as set forth.

2. The process of manufacturing composite metals, which consists in first making a solution of soluble salts of two or more metals, then in precipitating reducible salts of the two metals from such solution, whereby an intimate physical mixture will be secured, and finally in subjecting the reducible salts to the effect of heat in a reducing atmosphere to reduce the salts to the metallic state and to weld the metallic particles together, substantially as set forth.

3. The process of making a nickel-cobalt composite, which consists in first obtaining a solution of sulfate of nickel and sulfate of cobalt in the desired proportion, then in precipitating by means of an alkali, hydroxids of the two metals in intimate physical admixture, and in finally subjecting said hydroxids to heat in a reducing atmosphere to reduce the hydroxids to the metallic state and to weld the metallic particles together, substantially as set forth.

4. The process of making a nickel-cobalt composite, which consists in first obtaining a solution of sulfate of nickel and sulfate of cobalt in the desired proportion, then in precipitating by means of an alkali, hydroxids of nickel and cobalt from said solution, then in washing the precipitated hydroxids, and finally in subjecting the same to the effect of heat in a reducing atmosphere to reduce the hydroxids to the metallic state and to weld the metallic particles together, substantially as set forth.

5. The process of making a nickel-cobalt composite, which consists in first obtaining a solution of sulfate of nickel and sulfate of cobalt in the desired proportion, then in precipitating by means of an alkali, hydroxids of the two metals from said solution, then in washing the precipitated hydroxids, then in drying and screening the same into granules and finally in subjecting the said granules to the effect of heat in a reducing atmosphere to reduce the hydroxids to a metallic state and to weld the particles together, as and for the purposes set forth.

This specification signed and witnessed this 29th day of March, 1905.

THOMAS A. EDISON.

Witnesses:
FRANK L. DYER,
ANNA KLEHM.